Nov. 14, 1967     C. A. ELWELL     3,352,026
VISUAL-AUDITORY MEANS FOR MICROSCOPES
Filed July 6, 1965     4 Sheets-Sheet 1
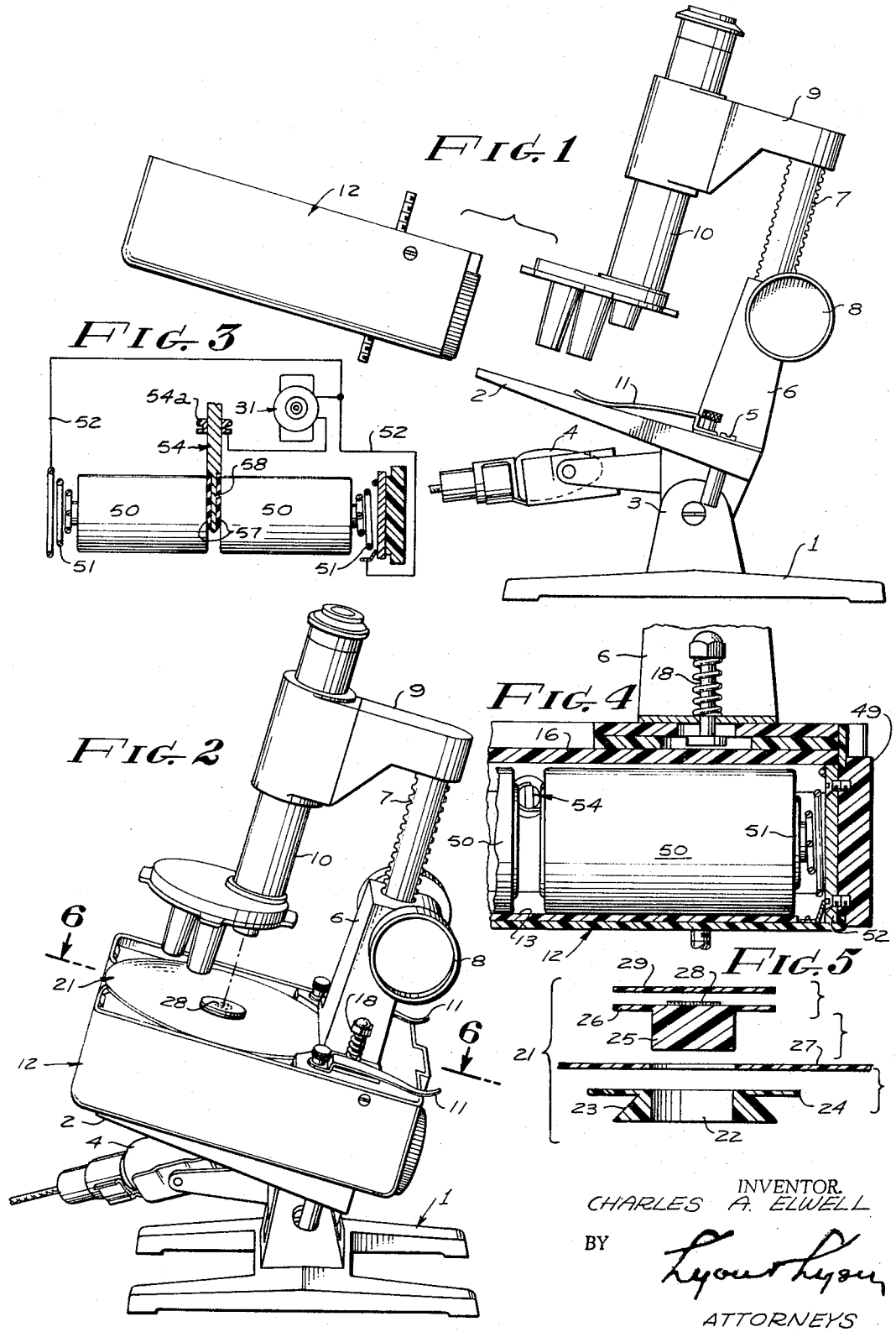
INVENTOR.
CHARLES A. ELWELL
BY
ATTORNEYS

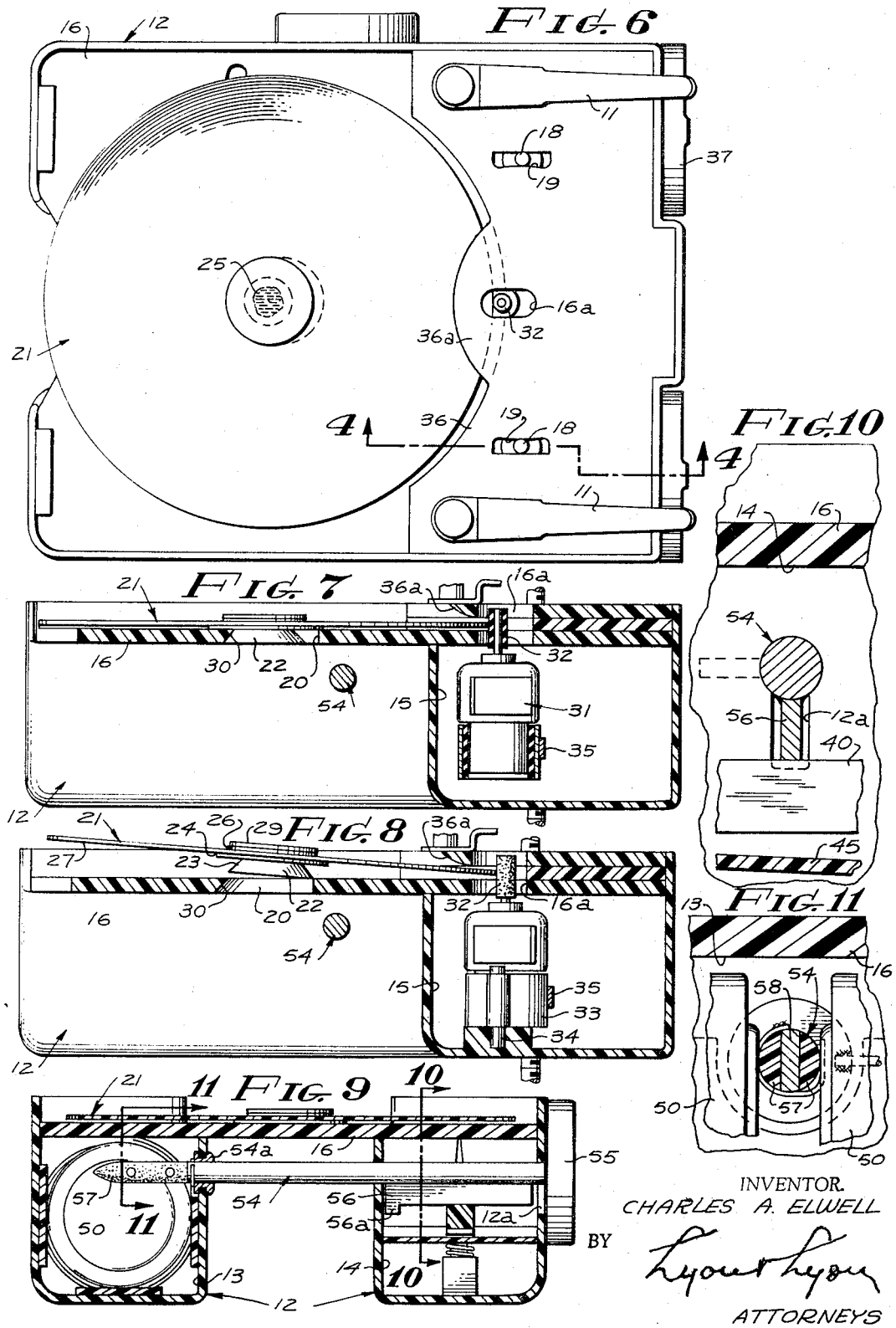

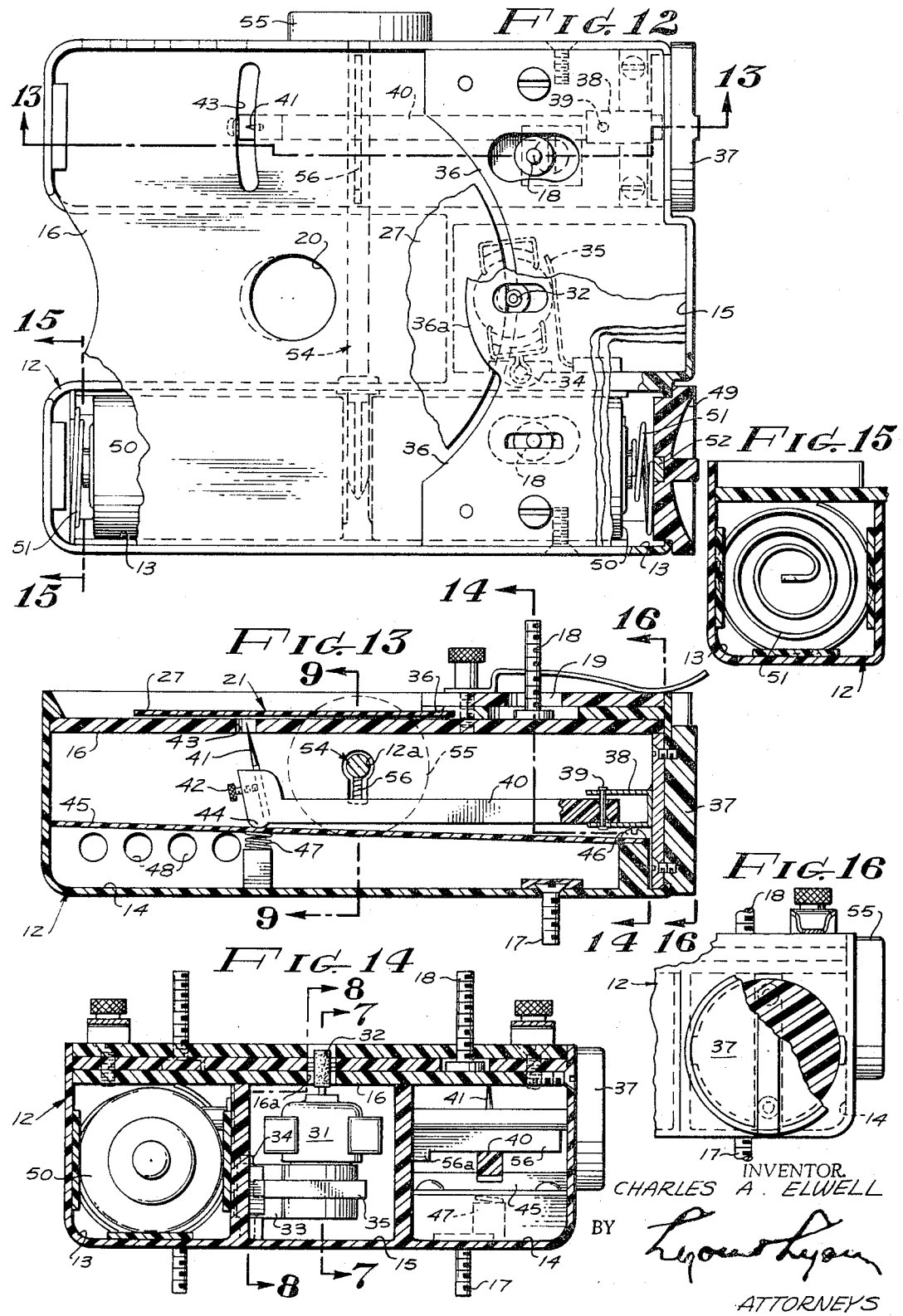

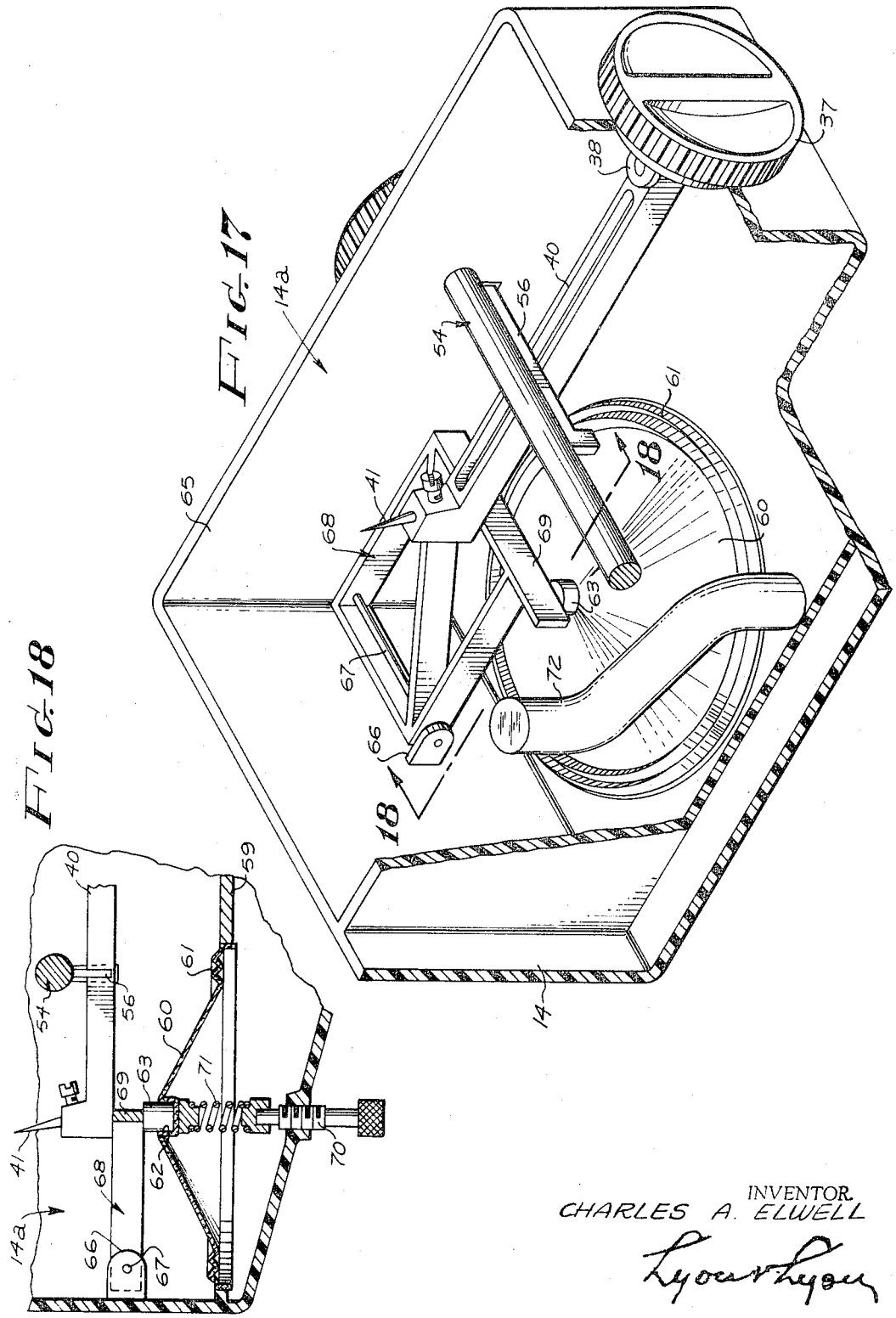

United States Patent Office 3,352,026
Patented Nov. 14, 1967

3,352,026
VISUAL-AUDITORY MEANS FOR MICROSCOPES
Charles A. Elwell, Gardena, and Reuben B. Klamer, Los Angeles, Calif., assignors to The Toy Development Center, Inc., a corporation of California
Filed July 6, 1965, Ser. No. 469,823
11 Claims. (Cl. 35—8)

ABSTRACT OF THE DISCLOSURE

An apparatus dimensioned to fit between the stage and optical system of a microscope and arranged to receive special visual-auditory records having a central fixed specimen holder and a rotatable sound record; the apparatus having a sound pickup unit and means for driving the sound record.

---

This invention relates to visual-auditory means for microscope study, and included in the objects of this invention are:

First, to provide a visual-auditory means for microscopes whereby a specimen and a recording are readily mounted on a microscope so that the specimen may be observed while the recording explains or otherwise assists in understanding the significance of the specimen is played.

Second, to provide a novel specimen and record unit wherein the specimen holding element also serves as a journal for the sound record element and wherein the unit may be readily handled and stored.

Third, to provide a visual-auditory means which includes in addition to the specimen and record holder a novel player mechanism adapted to be fitted on the stage of a microscope and which may be readily operated by a student.

Fourth, to provide a means of this class which incorporates a novelly arranged record disk wherein the record is disposed on the underside thereof and the record stylus is disposed within an enclosure not only to protect the stylus and record, but also to minimize the cost of manufacture and to minimize its size.

Fifth, to provide a visual-auditory means which, while particularly intended as an educational toy, may be employed as a teaching accessory.

With the above and other objects in view, as may appear hereinafter, rerference is directed to the accompanying drawings in which:

FIGURE 1 is a side view of a microscope with the visual auditory means shown in side elevation and spaced therefrom.

FIGURE 2 is a perspective view of the microscope showing the visual auditory means in position thereon.

FIGURE 3 is a circuit diagram.

FIGURE 4 is a fragmentary sectional view taken through 4—4 of FIGURE 6.

FIGURE 5 is a sectional view of the specimen and record unit with the parts separated for purposes of illustration.

FIGURE 6 is a plan view of the visual auditory means taken from 6—6 of FIGURE 2.

FIGURE 7 is a longitudinal sectional view taken through 7—7 of FIGURE 14, showing the specimen holder and record unit in operating position.

FIGURE 8 is a similar view of the manner in which the unit is inserted and taken through 8—8 of FIGURE 14.

FIGURE 9 is a sectional view taken through 9—9 of FIGURE 13.

FIGURE 10 is an enlarged fragmentary sectional view taken through 10—10 of FIGURE 9.

FIGURE 11 is a similar fragmentary sectional view taken through 11—11 of FIGURE 9.

FIGURE 12 is a partial plan partial sectional view of the visual auditory means.

FIGURE 13 is a longitudinal sectional view thereof taken through 13—13 of FIGURE 12.

FIGURE 14 is a transverse sectional view taken through 14—14 of FIGURE 13.

FIGURE 15 is a fragmentary sectional view taken through 15—15 of FIGURE 12.

FIGURE 16 is a partial end view partial sectional view taken through 16—16 of FIGURE 13.

FIGURE 17 is a fragmentary perspective view showing a modified record player unit.

FIGURE 18 is a fragmentary sectional view taken through 18—18 of FIGURE 17.

The visual auditory means is adapted to be used with the conventional microscope which includes a base 1 and a stage 2 joined by a pivotal connection 3. The stage is provided with an aperture, not shown, under which is located a light source 4. Secured to the stage by mounting screws 5 is a pedestal 6 from which extends an adjustment rack 7 operated by a hand wheel 8.

The extended end of the rack is provided with a bracket 9 which supports an optical assembly 10 having an axis which aligns with the aperture in the stage 2. Spring clips 11 conventionally hold a specimen slide under the optical assembly.

The visual auditory means includes a housing 12 which is essentially U-shaped to form a battery compartment 13 and a record player compartment 14 forming the two legs of the housing. These two compartments are connected at one end by a motor compartment 15. The upper side of the housing including the space between the battery and record player compartments, receives a cover plate 16. Extending from the bottom of the housing is a pair of adapter screws 17 which replace the mounting screws 5 of the microscope so that the housing may be secured to the stage 2. To accomplish this, the pedestal 6 is removed from the stage 2 and mounted on the top of the cover plate by means of adapter screws 18.

The adapter screws are held captive in slots 19 dimensioned to permit movement of the optical axis of the optical assembly within the boundaries of an aperture 20 provided in the cover plate or deck 16. The aperture 20 aligns with the aperture in the stage 2.

The cover plate or deck is adapted to receive a series of series specimen and record units 21. Each unit includes a bottom ring 22 having conically sloping sides 23, joined at their upper or smaller ends to a flange 24.

The central opening through the ring receives a plug 25 having a flange 26. Journalled on the plug 25 between the flange 24 and 26 is a sound record disk 27. The upper end of the plug 25 receives a specimen 28 suitable for observation under microscope. The speciment is protected by a cover disk 29. The various parts of the specimen holder and record unit are formed of plastic material and at least the plug or journal 25 and cover disk 29 are transparent.

The bottom ring 22 fits within the aperture 20. The margin of the aperture 20 remote from the motor compartment is undercut as indicated by 30 so as to mate with the conical side 23 of the bottom ring as shown in FIGURE 7.

The motor compartment 15 receives a battery driven motor 31 having a drive spindle 32. The motor is held by a bracket 33 which is arranged for pivotal movement about an offset vertical axis by means of a pin 34. The drive spindle etxends upwardly through a slot 16a in the cover plate 16 and is arranged to engage the periphery of the sound record disk 27. The spindle is urged into engagement by a leaf spring 35 which bears against the bracket 32.

In the region above the motor compartment 15, the cover plate or deck is increased in height to form an arcuate shoulder 36 concentric with the aperture 20. The shoulder is interrupted by the slot 16a to expose the spindle 32. Extending from the shoulder 36 is a projection 36a overlying and spaced from the cover plate or deck 16. The underside of the projection is beveled so that a margin of the sound record disk may be inserted as shown in FIGURE 8.

The record player compartment 14 is provided with an open end which receives a cover disk 37 notched in such a manner that it may be inserted in the opening and then rotated a predetermined distance so as to be secured in place. The cover disk is provided with a bracket 38 having a pivot pin 39 which journals a stylus arm 40 about a vertical axis. The opening through the stylus arm which receives the pin 39 is beveled in such a manner that the stylus arm may not only rotate about the axis of the pivot pin, but is capable of limited transverse pivotal movement.

The extended end of the stylus arm is upturned and receives a needle 41 held by a screw 42. The needle extends upwardly through a slot 43 provided in the cover plate 16. The underside of the stylus arm 40 is provided with a small boss 44 which rests on a sound amplifying membrane 45 extending the length of the record player compartment 14 and secured by screws 46 near the cover disk 37.

A light spring 47 is disposed under the membrane 45 so as to urge the membrane upwardly against the boss 44 and also to urge the needle 41 against the underside of the sound record disk 27. The underside of the disk carries the sound record. The record player compratment 14 is provided with openings 48 for the emission of sound.

The battery compartment 13 is provided with a cover disk 49 which may be locked in place in the manner of the cover disk 37. The battery compartment receives a pair of batteries 50 arranged with their base ends in confronting relation. Contact springs 51 are disposed at the ends of the battery compartment for connection to lead wires 52 indicated in FIGURE 3.

Extending transversely through the record player compartment 14 across the space between the compartment 13 and 14 and through the battery compartment 13 is a control shaft 54 which is adapted to rotate and is provided with a knob 55. The portion of the control shaft within the record player compartment 14 is provided with a cam rib 56 which is engageable with the stylus arm 40 as shown in FIGURE 13 to depress the stylus arm. The cam rib is provided with a projection 56a at one end adapted to engage and move the stylus arm 40 transversely. The portion of the control shaft extending into the battery compartment is provided on lateral sides with insulating segments 57 so as to form therebetween a contact blade 58. The shaft is electrically connected to the motor 31 through a contact ring 54a. The wall of the housing 12 adjacent the knob 55 is provided with a key slot 12a so that when the cam rib is positioned to depress the stylus arm, the shaft may be partially withdrawn.

Operation of the visual auditory means is as follows:

The entire assembly is mounted as a unit on the stage 2 of a microscope by first removing the pedestal 6. The pedestal 6 is remounted on the top of the housing 12. The slots 19 permit movement of the pedestal and the optical assembly 10 in two directions so that all portions of the specimen may be viewed.

A specimen holder and record unit 21 is inserted in the aperture 20 in the manner indicated in FIGURES 7 and 8; that is, the unit is tilted so that a margin of the sound record disk 27 may be inserted under the projection 36. The arcuate shoulder 36 aids in registering the bottom ring with the aperture 20. When the bottom ring 22 is received in the aperture 20, the margin of the disk 27 engages the drive spindle 32 of the motor 31 and the speciment holder and record unit 21 is urged along a diametrical axis by the action of the leaf spring 35 against the motor 31, which in turn presses the drive spindle 32 against the sound record disk 27.

When the specimen holder and record unit 21 is in place, the plug 25 and bottom ring 22 are restrained against rotation and serve as a journal for the sound record disk 27. If it is desired to orient the specimen in some particular direction, suitable slot and rib means may be provided on the conical side of the bottom ring 22 and in the side of the aperture 20.

Prior to fitting the specimen holder and record unit 21 in place, the control shaft 54 is turned so that the cam 56 depresses the stylus arm 40 as shown in FIGURES 9, 10, 13 and 14. In this position, the cam 56 aligns with the key slot 12a to permit partial withdrawal of the control shaft. Withdrawal of the control shaft moves the stylus arm 40 laterally to the starting margin of the sound recording.

This manipulation of the control shaft is also utilized to permit changing the needle 41. That is, when the stylus arm 40 is depressed, the cover 37 and stylus arm 40 may be rotated 90° from the position shown in FIGURES 13 and 14 to unlatch the cover and extract the stylus arm.

When the control shaft is partially withdrawn, its extended end clears the battery compartment to permit the batteries 50 to be inserted or interchanged. The pointed end of the shaft permits forcing the shaft between the batteries, so that, when the shaft is rotated 90° from the position shown in FIGURES 3 and 11, the electrical circuit is completed.

After the specimen holder and record unit 21 has been positioned, the control shaft is rotated so as to release the stylus arm 40 and permit the stylus or needle 41 to engage the sound track on the underside of the record; simultaneously, the motor 31 is started. While the specimen is observed through the microscope, the observer will hear a record describing what is shown on the slide.

While the bottom ring 22 and plug 25 are preferably joined permanently, they may be separable so that the sound receiving disk 27 may be removed or turned over permitting a sound recording on both sides of the disk.

While the invention is primarily intended for use with microscopes, it should be observed that a photographic transparency may be substituted for a specimen. In this case, a projector is substituted for the microscope.

Reference is now directed to FIGURES 17 and 18. In this construction, the housing 12 is modified by providing an enlarged record player compartment 14a. The modified compartment extends to the battery compartment 13 and may include the motor compartment 15. Also, the modified housing may be adapted to be substituted for the microscope stage rather than mounted upon the stage.

The modified compartment 14a is provided with a partition 59 parallel with the top plate or deck 16 which is apertured to receive a speaker cone 60. The speaker cone is provided at its margins with annular ribs 61 to permit substantial deflection. A recess 62 is provided at the apex of the cone in which is cemented a plug 63.

Hinged between a side wall 65 and a bracket 66 by means of a hinge pin 67, is a motion transmitting frame 68 having a bar 69 disposed under the extremity of the stylus arm 40. The bar 69 rests on the plug 63.

An externally accessible adjustment screw 70 extends upwardly from the underside of the compartment 14a in alignment with the axis of the cone 60. A spring 71 is interposed between the screw 70 and the apex of the cone.

In order to transmit light to the underside of the specimen, a light transmitting rod 72 curved to avoid the cone 60 may be used.

Operation of the modified record player is as follows:

When the stylus arm 40 is depressed by the cam 56, the ribs 61 permit the needed deflection of the cone 60 without damage to the cone. When the stylus arm 40 is released, the spring 71 urges the needle 41 into engagement with the record disk 27. The frame 68 is rigid and by reason of the spaced points at which it is pivoted, its movement in response to vibration of the needle 41 is uniform throughout the range of movement of the needle so that the sound reproduction remains constant throughout the record.

Adjustment of the screw 70 varies the pressure exerted by the needle 41 on the record disk 27. This has the effect of varying the speed of the disk, so that the record may be played fast or slow, depending upon the desire of the user.

It should be observed that with both record player constructions shown, the record may be stopped at any time merely by turning the knob 55. Thus, the user can interrupt the comments or instructions relative to the specimen while studying the specimen, and then restart the record. The record coasts about one turn as the needle is depressed with the result that on restarting the record, the last few words are repeated so that the continuity is not lost.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. A visual auditory means for use with microscopes, comprising:
   (a) a housing structure adapted for mounting on the stage of a microscope and having an aperture positioned for alignment with the optical system of the microscope;
   (b) a specimen holder including means for mounting a specimen on its upper side and a journal at its lower side adapted to fit said aperture;
   (c) a sound record disk rototably carried by said journal;
   (d) a drive means engageable with the periphery of said disk and applying a diametrically directed force against said disk and journal to restrain said journal against rotation in said aperture while causing rotation of said disk;
   (e) and means for playing the sound record on said disk.

2. A visual auditory means for use with microscopes according to claim 1 wherein:
   (a) the sound record is on the underside of said disk facing said housing;
   (b) and said record playing means includes a sound reproducing means within said housing and a stylus extending upwardly therethrough for engagement with said sound record.

3. A visual auditory means for use with microscopes, comprising:
   (a) an essentially U-shaped housing structure adapted for mounting on the stage of a microscope, said housing defining a battery compartment in one leg thereof, a record player compartment in the other leg thereof, a motor compartment in the cross portion thereof, and a deck bridging between said legs having an aperture positioned for alignment with the optical system of the microscope;
   (b) a specimen holder including means for mounting a specimen on its upper side and a transparent journal at its lower side adapted to fit said aperture, its under side being exposed between said legs for transmission of light to said specimen;
   (c) a sound record disk rotatably carried by said journal;
   (d) a drive motor in said motor compartment including a drive spindle extending upwardly from said housing for engagement with the periphery of said disk;
   (e) and a record player in said record player compartment including a stylus projecting upwardly from said housing for engagement with said sound record disk.

4. A visual auditory means for use with microscopes, comprising:
   (a) a housing structure adapted for mounting on the stage of a microscope, said housing defining a battery compartment, a record player compartment, a motor compartment, and an aperture positioned for alignment with the optical system of the microscope;
   (b) a specimen holder including means for mounting a specimen on its upper side and a journal at its lower side adapted to fit said aperture;
   (c) a sound record disk rotatably carried by said journal;
   (d) a drive motor in said motor compartment including a drive spindle extending upwardly from said housing for engagement with the periphery of said disk;
   (e) and a record player in said record player compartment, said record player including a pivotally mounted stylus arm, extending longitudinally in said compartment an upwardly directed stylus at the extremity of said arm, a sound reproducing membrane secured at one end of said compartment and extending longitudinally under said stylus arm, said membrane engageable with the underside of said arm adjacent said stylus, and yieldable means urging said mebrane upwardly against said arm thereby to urge said stylus upwardly for engagement with said sound record disk.

5. A visual-auditory means comprising:
   (a) a housing structure having an aperture;
   (b) a transparent member including a journal disk dimensioned to fit said aperture and resist rotation therein, and means within the boundaries of said journal adapted for visual observation;
   (c) a sound record disk rotatably carried by said journal;
   (d) a drive means engageable with the periphery of said disk and applying a diametrically directed force against said disk and journal to restrain said journal against rotation in said aperture while causing rotation of said disk;
   (e) and means for playing the sound record on said disk.

6. A record player, comprising:
   (a) a housing;
   (b) means for rotatably supporting a sound record thereon with the sound track facing toward the housing;
   (c) means for rotating said sound record;
   (d) a needle arm having a record playing needle at its extremity, said needle arm being pivotally mounted in said housing to raise and lower said needle to and from the sound record and to move said needle laterally between radially outer and radially inner positions under said sound record;
   (e) yieldable means urging said needle arm upwardly and said needle toward said record;
   (f) a shaft rotatably and slidably mounted in said housing and traversing said needle arm;
   (g) a cam rib extending along one side of said shaft operable on rotation of said shaft, to lower said needle arm, thereby to clear said needle from said record;
   (h) a lug at one end of said cam rib operable when said needle arm and needle are lowered and said shaft is moved slidably, to move said needle arm and needle toward the starting end of said record;
   (i) and means for preventing sliding movement of said shaft when said needle arm is raised.

7. A record player according to claim 6, in which:
(a) a sound reproducing means is disposed under said shaft in yieldable contact therewith to receive vibrations therefrom.

8. A record player according to claim 7, wherein:
(a) said sound reproducing means includes a speaker cone having means at its apex for mechanical engagement, and a frame pivotable about a single axis having a sound transmitting bar extending the range of lateral movement of said needle arm and interposed between said needle arm and the apex of said cone.

9. A record player according to claim 8, wherein:
(a) a spring urges said cone against said bar, thereby to urge said needle toward said sound record;
(b) and means is provided to adjust the force of said spring thereby to vary the load of said needle on said sound record to vary the speed of rotation thereof.

10. A record player according to claim 6, wherein:
(a) said sound record rotating means is an electric motor, and a power supply therefor;
(b) said shaft includes contact means for operating said electric motor, said contact means disconnecting said electric motor when said shaft is turned to move said needle clear of said sound record, and connecting said electric motor when said needle is caused to engage said sound record.

11. A visual auditory record for use with a combined viewing and sound reproducing means in which said means is provided with a mounting aperture and a motor drive movable radially with respect to said aperture, said record comprising:
(a) a transparent specimen holder having a specimen at its upper side;
(b) a sound record;
(c) means for journalling said sound record in concentric relation to said specimen holder;
(d) a retaining means below said journalling means fitting said aperture;
(e) and said retaining means being pressed radially against a side of said aperture to prevent rotation thereof when said motor drive is pressed radially against said sound disk.

References Cited
UNITED STATES PATENTS

| | | | |
|---|---|---|---|
| 2,961,922 | 11/1960 | Schwartz | 35—8.1 |
| 3,027,164 | 3/1962 | Hasselbach | 274—9 |
| 3,095,201 | 6/1963 | Ryan | 274—1.1 |
| 3,234,687 | 2/1966 | Elwell | 274—1.1 |
| 3,245,312 | 4/1966 | Paull | 88—28 |

EUGENE R. CAPOZIO, *Primary Examiner.*

W. W. NIELSEN, *Assistant Examiner.*